United States Patent [19]

Troxler et al.

[11] Patent Number: 4,535,145
[45] Date of Patent: Aug. 13, 1985

[54] PROCESS FOR THE PREPARATION OF POLYESTERS FROM ALIPHATIC DICARBOXYLIC ACIDS AND POLYALKYLPIPERIDYL DIOLS

[75] Inventors: Eduard Troxler, Basel, Switzerland; Thomas Kainmüller, Lindenfels; Rudolf Maul, Lorsch, both of Fed. Rep. of Germany

[73] Assignee: Ciba-Geigy Corporation, Ardsley, N.Y.

[21] Appl. No.: 626,507

[22] Filed: Jun. 29, 1984

[30] Foreign Application Priority Data

Jul. 8, 1983 [CH]  Switzerland ............... 3765/83

[51] Int. Cl.³ .............. C08G 63/44; C08G 73/16
[52] U.S. Cl. ..................... 528/289; 528/275; 528/279
[58] Field of Search ............ 528/275, 289, 279

[56] References Cited

U.S. PATENT DOCUMENTS

| | | | |
|---|---|---|---|
| 4,001,190 | 1/1977 | Tanikella et al. | 528/289 |
| 4,232,131 | 11/1980 | Rody et al. | 525/184 |
| 4,265,805 | 5/1981 | Thomas | 524/102 |
| 4,322,522 | 3/1982 | Johnson et al. | 528/289 |

*Primary Examiner*—Lucille M. Phynes
*Attorney, Agent, or Firm*—Luther A. R. Hall

[57] ABSTRACT

The invention relates to a novel process for the preparation of compounds of the formula I

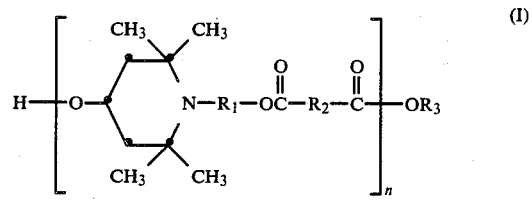

by polycondensation of a diol of the formula II

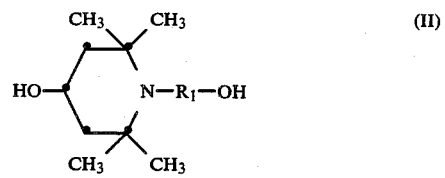

with a dicarboxylic acid ester of the formula III

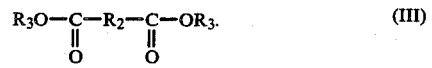

In the above formulae, the substituents and symbols $R_1$, $R_2$, $R_3$ and n are as defined in claim 1.

The process comprises stirring the reaction medium which contains an excess of 2 to 50 mol. %, based on the diol of formula II, of the dicarboxylic acid ester of the formula III, in the presence of at least 0.03 mol. % of a suitable catalyst, until the bulk of the alkanol of the formula $R_3OH$ formed during the reaction is distilled off, under a pressure of 0.7 to 1.3 bar, and thereafter stirring under a pressure of less than 5 mbar, in the temperature range from 100° to 170° C., and subsequently working up the resultant melt in conventional manner.

5 Claims, No Drawings

PROCESS FOR THE PREPARATION OF POLYESTERS FROM ALIPHATIC DICARBOXYLIC ACIDS AND POLYALKYLPIPERIDYL DIOLS

The present invention relates to a novel process for the preparation of polyesters of aliphatic dicarboxylic acids and polyalkylpiperidyl diols by reacting a corresponding diol with an excess of an aliphatic dicarboxylic acid ester in the melt and in the presence of small amounts of a suitable catalyst.

The preparation of a polysuccinate from 1-(2-hydroxyethyl-2,2,6,6-tetramethyl-4-hydroxypiperidine is already known from U.S. Pat. No. 4,233,412 (Example 1). According to the method described therein, the reaction is carried out in xylene in the presence of at least 7 mol.% of a catalyst, based on the piperidine compound, in the temperature range from 100°–145° C., while distilling off methanol. At a final concentration of the product in the reaction solution of 65% by weight, a polysuccinate having an average molecular weight $\overline{M}_n$ of at most 4000 is obtained. The yellow product so obtained does not meet entirely the present technical requirements with respect to colour.

Surprisingly, it has now been found that by carrying out the reaction in the melt with an excess of a dicarboxylic acid ester, and using a suitable catalyst in substantially smaller amounts, it is possible to obtain, in almost quantitative yield, polyesters of the above mentioned type which have an adjustable average molecular weight $\overline{M}_n$ of about 2500 to about 7000 and are entirely satisfactory as regards colour. A further advantage of the process of this invention is that no solvents are employed. Aside from the significant reduction in wastewater pollution, this also means that the generally acknowledged difficult removal of troublesome solvent residues from polymers can be dispensed with.

The polyesters obtainable by the process of this invention are generally known as useful stabilisers for organic materials.

Accordingly, the present invention relates to a process for the preparation of compounds of the formula I

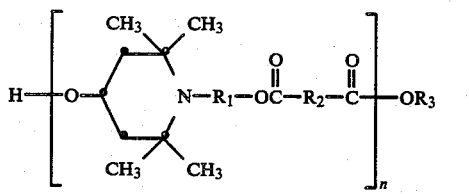

wherein n is a value from 8 to 25, preferably from 10 to 20, $R_1$ and $R_2$, each independently of the other, are $C_1$–$C_{18}$alkylene, $C_2$–$C_{18}$alkylene which is interrupted by —O—, —S— or —N(R)—, in which R is hydrogen or $C_1$–$C_4$alkyl, or are $C_4$–$C_8$alkenylene, and $R_3$ is $C_1$–$C_4$alkyl, by polycondensation of a diol of the formula II

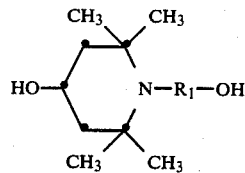

with a dicarboxylic acid ester of the formula III

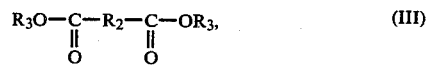

which process comprises stirring the reaction medium which contains an excess of 2 to 50 mol.%, preferably 5 to 20 mol.%, based on the diol of the formula II, of the dicarboxylic acid ester of the formula III, in the presence of at least 0.03 mol.%, also based on the diol of the formula II, of an oxide or of an organometal compound of a metal of the 4th main group or of the 4th auxiliary group of the Periodic Table, until the bulk, preferably 70 to 80%, of the alkanol of the formula $R_3OH$ which forms during the reaction is distilled off, under a pressure of 0.7 to 1.3 bar, preferably of 0.9 to 1.1 bar, and subsequently stirring preferably for 2 to 8 hours, in particular for 2½ to 4 hours, under a pressure of less than 10 mbar, preferably of less than 5 mbar, in the temperature range from 100° to 170° C., preferably from 120° to 150° C., and then working up the melt so obtained in conventional manner.

Suitable catalysts are e.g. germanium and zirconium dioxide and those of the formulae IV and V

wherein $R_4$ is $C_1$–$C_{18}$alkyl, phenyl or benzyl, and $R_5$ is $C_4$–$C_{12}$alkyl.

Preferred catalysts are dibutyltin oxide and, especially, tetrabutyl orthotitanate and tetraisopropyl orthotitanate.

$R_1$ and $R_2$ as $C_1$–$C_{18}$alkylene are preferably $C_2$–$C_6$alkylene, e.g. methylene, dimethylene, trimethylene, tetramethylene, hexamethylene, 2,2-dimethyltrimethylene, octamethylene, nonamethylene, decamethylene, dodecamethylene or octadecamethylene. Ethylene is preferred. $R_1$ and $R_2$ are preferably the same.

$R_1$ and $R_2$ as $C_2$–$C_{18}$alkylene which is interrupted by —O—, —S— or —N(R)— are e.g. 2-thiapropyl-1,3-ene, 3-thiapentyl-1,5-ene, 4-oxaheptamethyl-1,7-ene, 3,6-dioxaoctamethyl-1,8-ene or 3,6-diazaoctamethyl-1,8-ene.

$C_1$–$C_4$Alkyl is methyl, ethyl, n-propyl, isopropyl, n-butyl, sec-butyl or tert-butyl. $R_4$ as $C_1$–$C_{18}$alkyl is additionally e.g. n-pentyl, 2,2-dimethylpropyl, n-hexyl, 2,3-dimethylbutyl, n-octyl, 1,1,3,3-tetramethylbutyl, nonyl, decyl, dodecyl, hexadecyl or octadecyl. $R_5$ as $C_4$–$C_{12}$alkyl is e.g. n-butyl, n-pentyl, n-hexyl, n-octyl, n-decyl or n-dodecyl. $R_3$ is preferably methyl or ethyl. $R_4$ is preferably n-butyl or isopropyl. $R_5$ is preferably n-butyl or n-octyl.

$R_1$ and $R_2$ as $C_4$–$C_8$alkenylene are e.g. 2-butenyl-1,4-ene.

The catalysts are added in amounts of at least 0.03 mol.%, preferably from 0.05 to 1.0 mol.%, based on the diol of the formula II.

The value n can be adjusted by varying the excess of dicarboxylic acid ester of the formula III.

The preferred diol of the formula II is 1-(2-hydroxyethyl)-2,2,6,6-tetramethyl-4-hydroxypyridine. The preferred dicarboxylic acid ester of the formula III is dimethyl succinate.

The process of the present invention ensures a substantially better time/space yield.

The compounds of formula I are useful stabilisers for organic materials which are subjected to decomposition, preferably for synthetic polymers.

The invention is illustrated by the following non-limitative Examples.

EXAMPLE 1

In a 10 liter stainless steel reactor, 3556 g (17.7 moles) of 1-(2-hydroxyethyl)-2,2,6,6-tetramethyl-4-hydroxypiperidine and 2839 g (19.4 moles) of dimethyl succinate are heated to 150° C., with stirring and while introducing a weak stream of nitrogen. After stirring for 30 minutes at 150° C., 4 g (0.014 mole) of tetraisopropyl orthotitanate are added to the melt. While introducing a weak stream of nitrogen, the reaction mixture is stirred for 4 hours at 140°–150° C., during which time 800 g of methanol are distilled off. An oil pump vacuum (<1 mbar) is then applied by means of a vacuum regulator at 140° C. over 30 minutes. After stirring for another 3 hours at 140° C., the viscous melt is discharged through the bottom valve. Yield: 4.8 kg of an amorphous, transparent, almost colourless solid with a softening range from 65°–80° C. (Kofler bank). The average molecular weight $\overline{M}n$ determined by vapour pressure osmometry is 3150.

EXAMPLE 2

In a 10 liter stainless steel reactor, 3556 g (17.7 moles) of 1-(2-hydroxyethyl)-2,2,6,6-tetramethyl-4-hydroxypiperidine and 2968 g (20.3 moles) of dimethyl succinate are heated to 150° C., with stirring and while introducing a weak stream of nitrogen. After stirring for 30 minutes at 150° C., 4 g (0.014 mole) of tetraisopropyl orthotitanate are added to the melt. While introducing a weak stream of nitrogen, the reaction mixture is stirred for 4 hours at 140°–150° C., during which time 820 g of methanol are distilled off. An oil pump vacuum (<1 mbar) is then applied by means of a vacuum regulator over 30 minutes and the temperature is raised to 160°–170° C. After stirring for 5 hours at 160°–170° C., the viscous melt is discharged through the bottom valve. Yield: 4.7 kg of an amorphous, almost colourless solid with a softening range from 95°–105° C. (Kofler bank). The average molecular weight $\overline{M}n$ determined by vapour pressure osmometry is 5800.

EXAMPLE 3

In a 10 liter stainless steel reactor, 3556 g (17.7 moles) of 1-(2-hydroxyethyl)-2,2,6,6-tetramethyl-4-hydroxypiperidine and 2839 g (19.4 moles) of dimethyl succinate are heated to 150° C., with stirring and while introducing a weak stream of nitrogen. After stirring for 30 minutes at 150° C., 5.3 g (0.021 mole) of dibutyltin oxide are added. While introducing a weak stream of nitrogen, the reaction mixture is stirred for 6 hours at 140°–150° C., during which time 800 g of methanol are distilled off. An oil pump vacuum (<1 mbar) is then applied by means of a vacuum regulator at 140° C. over 30 minutes. After stirring for another 7 hours at 140° C., the viscous melt is discharged through the bottom valve. Yield: 4.8 kg of an amorphous, transparent, almost colourless solid with a softening range from 75°–85° C. (Kofler bank). The average molecular weight $\overline{M}n$ determined by vapour pressure osmometry is 3100.

EXAMPLE 4

In a 10 liter stainless steel reactor, 3556 g (17.7 moles) of 1-(2-hydroxyethyl)-2,2,6,6-tetramethyl-4-hydroxypiperidine and 2839 g (19.4 moles) of dimethyl succinate are heated to 150° C., with stirring and while introducing a weak stream of nitrogen. After stirring for 30 minutes at 150° C., 5.9 g (0.021 mole) of tetraisopropyl orthotitanate are added to the melt. While introducing a weak stream of nitrogen, the reaction mixture is stirred for 2½ hours at 140°–150° C., during which time 810 g of methanol are distilled off. An oil pump vacuum (<1 mbar) is then applied by means of a vacuum regulator over 30 minutes. After stirring for another 2 hours at 140° C., the viscous melt is discharged through the bottom valve. Yield: 4.8 kg of an amorphous, transparent, almost colourless solid with a softening range from 75°–85° C. (Kofler bank). The average molecular weight $\overline{M}n$ determined by vapour pressure osmometry is 3200.

EXAMPLE 5

In a 10 liter stainless steel reactor, 3556 g (17.7 moles) of 1-(2-hydroxyethyl)-2,2,6,6-tetramethyl-4-hydroxypiperidine and 2839 g (19.4 moles) of dimethyl succinate are heated to 150° C., with stirring and while introducing a weak stream of nitrogen. After stirring for 30 minutes at 150° C., 4 g (0.014 mole) of tetraisopropyl orthotitanate are added to the melt. While introducing a weak stream of nitrogen, the reaction mixture is stirred for 4½ hours at 140°–150° C., during which time 810 g of methanol are distilled off. A vacuum of 5 mbar is then applied by means of a vacuum regulator over 30 minutes. After stirring for 4 hours at 140 C., the viscous melt is discharged through the bottom valve. Yield: 4.7 kg of an amorphous, transparent, almost colourless solid with a softening range from 70°–80° C. (Kofler bank). The average molecular weight $\overline{M}n$ determined by vapour pressure osmometry is 3300.

EXAMPLE 6

In a 10 liter stainless steel reactor, 3556 g (17.7 moles) of 1-(2-hydroxyethyl)-2,2,6,6-tetramethyl-4-hydroxypiperidine and 2839 g (19.4 moles) of dimethyl succinate are heated to 150° C., with stirring and while introducing a weak stream of nitrogen. After stirring for 30 minutes at 150° C., 4 g (0.014 mole) of tetraisopropyl orthotitanate are added to the melt. While introducing a weak stream of nitrogen, the reaction mixture is stirred for 4 hours at 140°–150° C., during which time 820 g of methanol are distilled off. An oil pump vacuum (<1 mbar) is then applied by means of a vacuum regulator over 30 minutes. After stirring for 2½ hours at 150° C., the viscous melt is discharged through the bottom valve. Yield: 4.8 kg of an amorphous, transparent, almost colourless solid with a softening range from 75°–85° C. (Kofler bank). The average molecular weight $\overline{M}n$ determined by vapour pressure osmometry is 3300.

What is claimed is:

1. A process for the preparation of a compound of the formula I

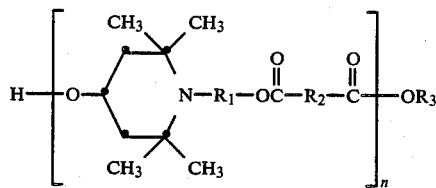

wherein n is a value from 8 to 25, preferably from 10 to 20, $R_1$ and $R_2$, each independently of the other, are $C_1$-$C_{18}$alkylene, $C_2$-$C_{18}$alkylene which is interrupted by —O—, —S— or —N(R)—, in which R is hydrogen or $C_1$-$C_4$alkyl, or are $C_4$-$C_8$alkenylene, and $R_3$ is $C_1$-$C_4$alkyl, by polycondensation of a diol of the formula II

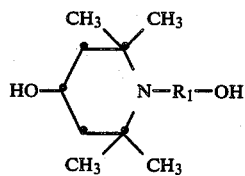

with a dicarboxylic acid ester of the formula III

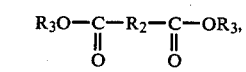

which process comprises stirring the reaction medium which contains an excess of 2 to 50 mol.%, based on the diol of the formula II, of the dicarboxylic acid ester of the formula III, in the presence of at least 0.03 mol.%, of an oxide or of an organometal compound of a metal of the 4th main group or of the 4th auxiliary group of the Periodic Table, until the bulk of the alkanol of the formula $R_3OH$ which forms during the reaction is distilled off, under a pressure of 0.7 to 1.3 bar, and thereafter stirring under a pressure of less than 10 mbar, in the temperature range from 100° to 170° C., and then working up the melt so obtained in conventional manner.

2. A process according to claim 1 for the preparation of a compound of the formula I, wherein n is a value from 10 to 20, $R_1$ and $R_2$ are ethylene and $R_3$ is methyl or ethyl, which comprises reacting 1-(2-hydroxyethyl)-2,2,6,6-tetramethyl-4-hydroxypiperidine with a 5 to 20 mol.% excess of methyl or ethyl succinate, based on the diol.

3. A process according to claim 1, which comprises stirring the reaction medium under a pressure of 0.9 to 1.1 bar until 70 to 80% of the alkanol of the formula $R_3OH$ formed during the reaction is distilled off, and thereafter stirring under a pressure of less than 5 mbar in the temperature range from 120° to 150° C.

4. A process according to claim 1, wherein the catalyst is used in an amount from 0.05 to 1.0 mol.%, based on the diol of the formula II.

5. A process according to claim 4, wherein tetrabutyl orthotitanate or tetraisopropyl orthotitanate is used as catalyst.

* * * * *